(12) United States Patent
Park et al.

(10) Patent No.: US 7,882,924 B2
(45) Date of Patent: Feb. 8, 2011

(54) MOTOR-DRIVEN POWER STEERING SYSTEM

(75) Inventors: Kisung Park, Hwaseong-si (KR); Sooboo Park, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 194 days.

(21) Appl. No.: 12/274,005

(22) Filed: Nov. 19, 2008

(65) Prior Publication Data
US 2009/0294207 A1 Dec. 3, 2009

(30) Foreign Application Priority Data
May 30, 2008 (KR) ...................... 10-2008-0050628

(51) Int. Cl.
*B62D 5/04* (2006.01)
(52) U.S. Cl. ..................................... 180/444
(58) Field of Classification Search ................. 180/443, 180/444, 446
See application file for complete search history.

(56) References Cited

U.S. PATENT DOCUMENTS

| | | | | |
|---|---|---|---|---|
| 4,598,787 A | * | 7/1986 | Drutchas | 180/444 |
| 4,621,701 A | * | 11/1986 | Takabayashi et al. | 180/444 |
| 4,907,668 A | * | 3/1990 | Onishi et al. | 180/443 |
| 4,972,320 A | * | 11/1990 | Sugiura et al. | 701/43 |
| 6,000,491 A | * | 12/1999 | Shimizu et al. | 180/444 |
| 7,410,028 B2 | * | 8/2008 | Chikaraishi | 180/402 |
| 7,677,114 B2 | * | 3/2010 | Deshmukh et al. | 73/862.328 |

FOREIGN PATENT DOCUMENTS

| | | |
|---|---|---|
| JP | 59-120570 A | 7/1984 |
| JP | 5-8739 A | 1/1993 |
| JP | 10-244949 A | 9/1998 |
| JP | 2007-62433 A | 3/2007 |
| JP | 2008-56241 A | 3/2008 |
| KR | 10-0469075 B1 | 2/2005 |

* cited by examiner

*Primary Examiner*—Kevin Hurley
(74) *Attorney, Agent, or Firm*—Morgan, Lewis & Bockius LLP

(57) ABSTRACT

According to the present invention, unlike to motor-driven power steering systems in the related art, it is possible to generate an appropriate assistant steering force that is required to drive the motor according to steering of the driver, without expensive components, such as a torque sensor and an electronic controller, such that it is possible to achieve a motor-driven power steering system having a simple structure at a low cost.

12 Claims, 6 Drawing Sheets

FIG. 3

| | INPUT PLATE(27) | SWITCH PLATE(7) | RESISTOR PLATE(9) | OUTPUT PLATE(23) |
|---|---|---|---|---|
| TOP | | | | |
| BOTTOM | | | | |
| CROSS SECTION | | | | |
| CIRCUIT | + —<br>— — — | + —<br>— — — | ─⋀⋀⋀─<br>─⋀⋀⋀─ | + —<br>— — — |
| OPERATION | • INPUT POWER FROM BATTERY | • APPLY POWER TO RESISTOR PLATE WHEN TORSION BAR IS DISTORTED | • RESISTANCE CHANGED ACCORDING TO AMOUNT OF TORSION OF TORSION BAR (TORSION, RESISTANCE)<br>• POLARITY CHANGED ACCORDING TO LEFT/RIGHT ROTATIONAL DIRECTION | • OUTPUT POWER TO MOTOR |

FIG.4
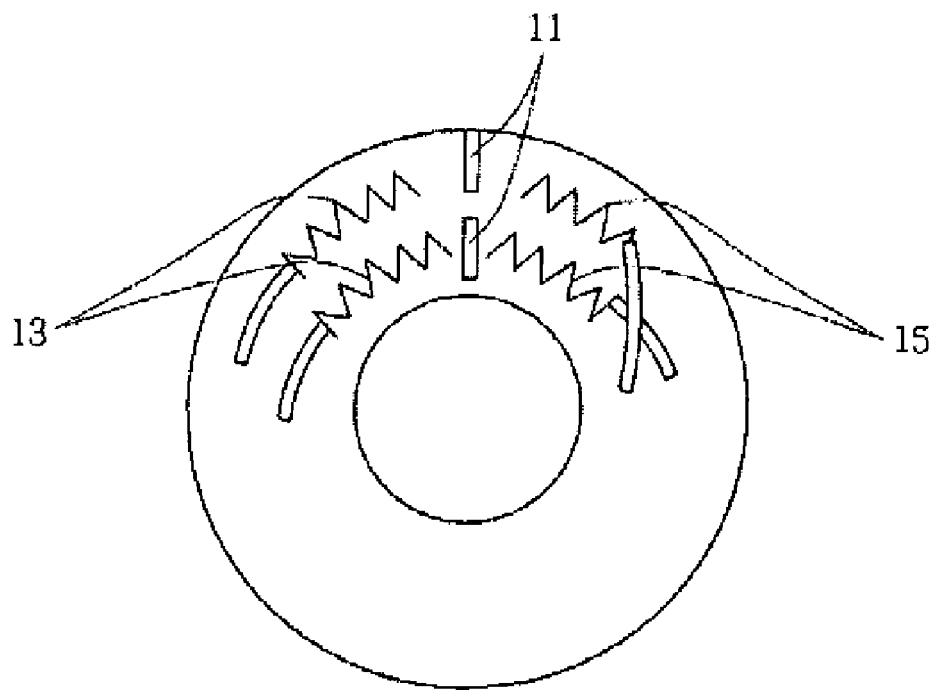
NO TURNING STEERING HANDLE-NO TORSION OF TORSION BAR
SHORT

FIG.5
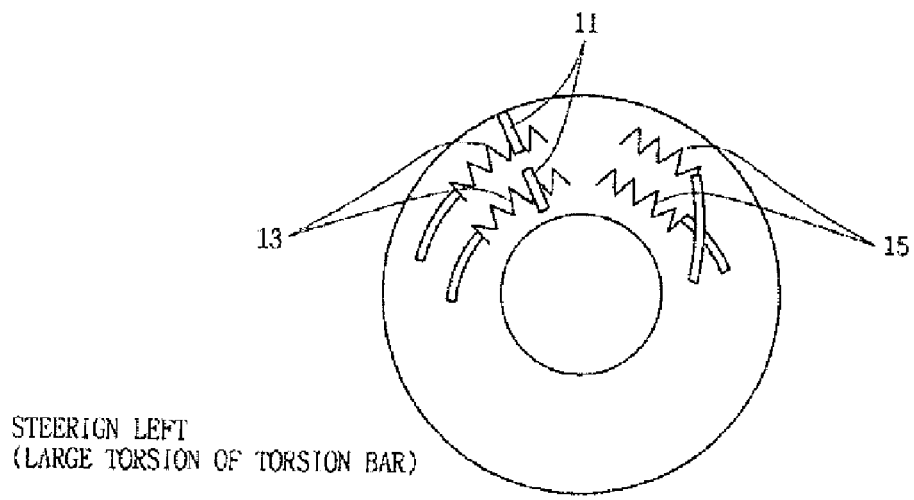
STEERIGN LEFT
(LARGE TORSION OF TORSION BAR)
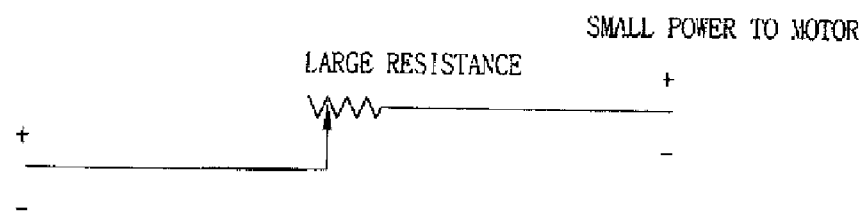
SMALL POWER TO MOTOR
LARGE RESISTANCE
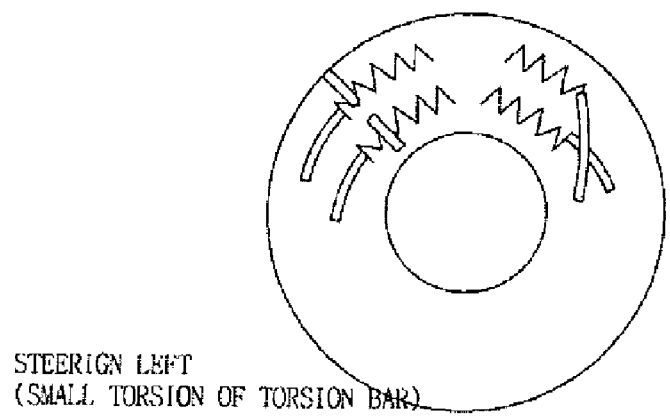
STEERIGN LEFT
(SMALL TORSION OF TORSION BAR)
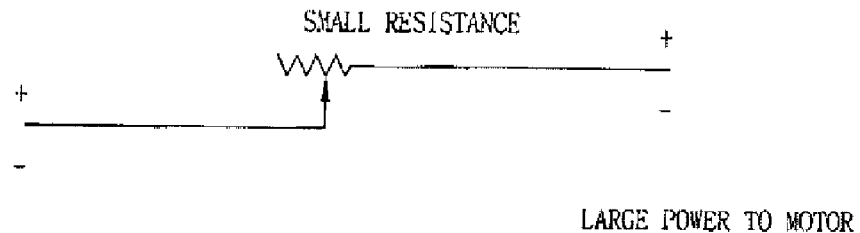
SMALL RESISTANCE
LARGE POWER TO MOTOR

FIG.6
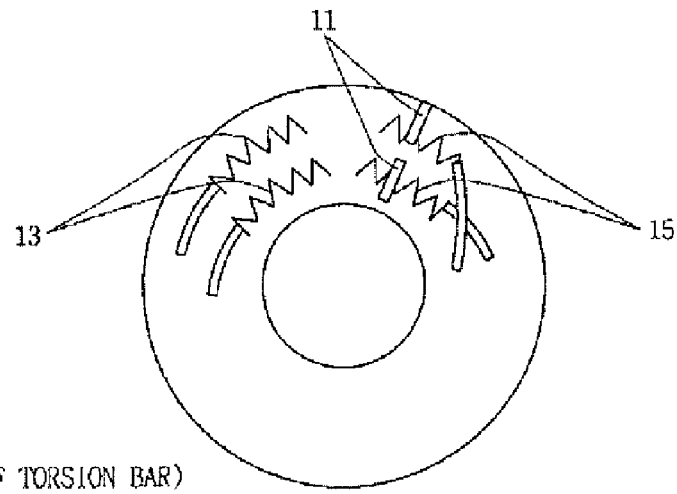
STEERIGN RIGHT
(SMALL TORSION OF TORSION BAR)
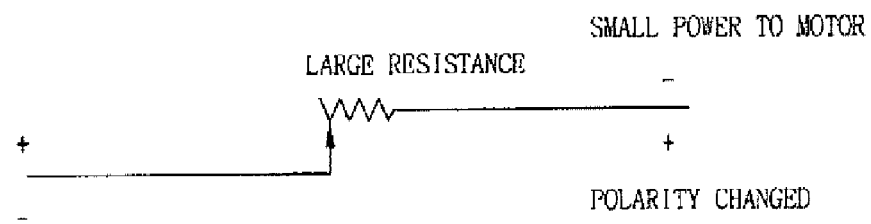
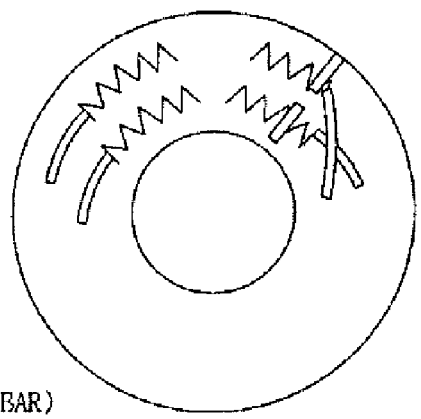
STEERIGN RIGHT
(LARGE TORSION OF TORSION BAR)
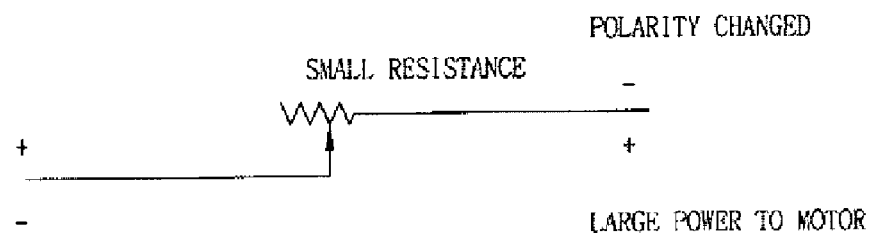

MOTOR-DRIVEN POWER STEERING SYSTEM

CROSS-REFERENCE TO RELATED APPLICATION

The present application claims priority to Korean Application Number 10-2008-0050628 filed May 30, 2008, the entire contents of which applications is incorporated herein for all purposes by this reference.

BACKGROUND OF THE INVENTION

1. Field of the Invention

The present invention relates to a motor-driven power steering system, particularly a motor-driven power steering system having a simple configuration at a low cost.

2. Description of Related Art

A power steering system of a vehicle is used to allow a driver to conveniently steer the vehicle by increasing a steering force that is applied by the driver and hydraulic power steering systems have been used in the related art. However, motor-driven power steering systems of which the weight and the number of components are reduced and the fuel consumption is decreased have attracted attention in recent years.

A motor-driven power steering system is a system that electrically receives a steering angle from a driver and generates an assistant steering force by driving a motor on the basis of the angle, and it is disadvantageous at present in the economic respect to use the motor-driven power steering system in a vehicle because it is expensive as compared with a hydraulic power steering system.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a motor-driven power steering system that is achieved by a simple configuration at the same or less cost than a hydraulic power steering system to electrically generate an assistant steering force when a driver steers a vehicle.

An aspect of the present invention is directed to a motor-driven power steering system including an input shaft that is connected to a steering handle, an output shaft that is connected to a steering wheel, a motor that is configured to provide an assistant steering force to the output shaft, a torsion bar that couples the input shaft with the output shaft to make a torsional displacement in steering, a switch plate disposed to the input shaft and a resistor plate disposed to the output shaft respectively, to change selectively resistance to and polarity of electricity that is conducted to the motor according the torsional displacement of the torsion bar, an input member that continuously supplies the electricity to the switch plate, the input member coupled to a first stationary member, and/or an output member that continuously outputs the electricity that has passed through the resistor plate, to the motor, the output member coupled to a second stationary member.

The motor may be configured to provide the assistant steering force to the output shaft in a rotation direction of the input shaft. The first stationary member may be an upper case. The second stationary member may be a lower case. The first and second stationary members are monolithically configured to be a case.

The switch plate may include a circular plate formed with a hole at the center portion thereof through which the torsion bar passes, and/or insulated switch electrodes radially disposed in the circular plate and exposed to the outside at both upper and lower surfaces of the circular plate. The resistor plate may include a circular plate formed with a hole at the center portion thereof through which the torsion bar passes, a pair of first variable resistors and a pair of second variable resistors formed on the same side of the circular plate, which are electrically insulated respectively and have a shape corresponding to trajectories that are constructed when the insulated switch electrodes of the switch plate turn from a neutral position with respect to the torsion bar, the pair of the first variable resistors and the pair of the second variable resistors provided on the side facing the switch plate, electrical plate patterns that are electrically connected with the pairs of the first variable resistors and the second variable resistors respectively and provided on the opposite side to the pairs of first resistors and second resistors, the electrical plate patterns coaxially disposed and electrically insulated. The outer resistor of the first variable resistors may be connected with outer one of the electrical plate patterns and inner resistor of the first variable resistors may be connected with inner one of the electrical plate patterns. The outer resistor of the second variable resistors may be connected with inner one of the electrical plate patterns and inner resistor of the second variable resistors may be connected with outer one of electrical plate patterns. When torsion of torsion bar is increased, resistance of the pair of the first variable resistors circuit may be configured to be increased and the second variable resistor may be short and when rotation direction of torsion bar is opposite and the torsion of the torsion bar is increased, the pair of the first variable resistors may be short and the resistance of the pair of the second variable resistors may be configured to be increased.

The motor-driven power steering system may further include a column shaft that covers outer sides of the input shaft, the torsion bar, and the output shaft, and/or the first stationary member and the second stationary member that are fixed to the column shaft and covers the resistor plate and the switch plate. The switch plate may be fixed to the first stationary member. The first stationary member may be an upper case. The resistor plate may be fixed to the second stationary member. The second stationary member may be a lower case. The upper case and lower case may be made monolithically.

The input member may include a circular plate formed with a hole at the center portion through which the torsion bar passes, and/or electrical input plate patterns that are coaxially formed on a surface facing the switch plate and in electrical contact with the insulated switch electrodes of the switch plate. The output member may include a circular plate, formed with a hole at the center portion through which the torsion bar passes, and/or output electrodes being in electrical contact with the circular electrical plate patterns of the switch plate and electrically connected to the motor.

Another aspect of the present invention is directed to a passenger vehicle which may include any of the above-mentioned motor-driven power steering systems.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 3 is a view illustrating the structure and properties of some components using a table according to an aspect of the present invention.

FIGS. 4 to 6 are views illustrating the operation according to an aspect of the present invention, in which FIG. 4 illustrates a neutral position, FIG. 5 illustrates steering to the left, and FIG. 6 illustrates steering to the right.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
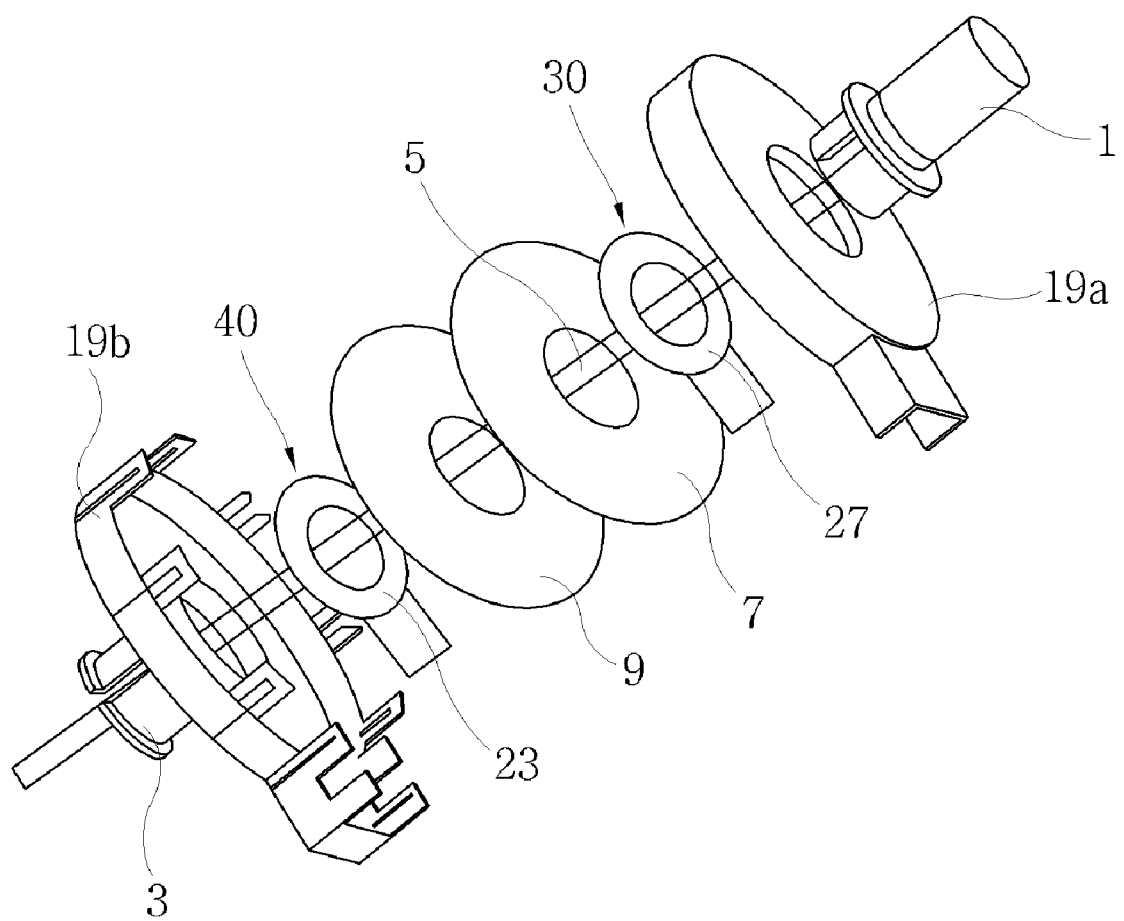
FIG. 1 is an exploded perspective view illustrating the structure of an exemplary motor-driven power steering system according to an aspect of the present invention.
Figure 2:
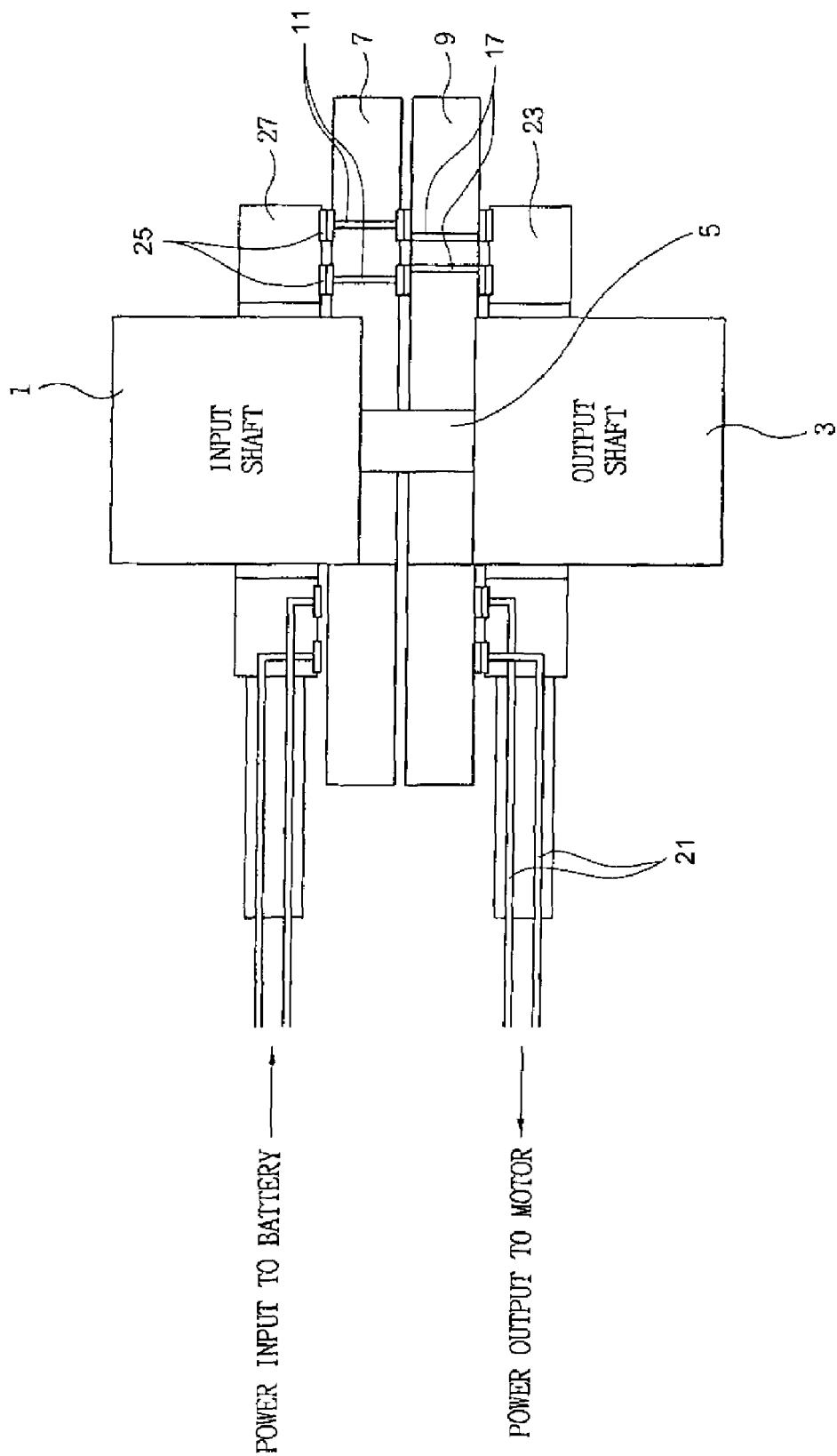
FIG. 2 is a cross-sectional view illustrating an exemplary motor-driven power steering system according to an aspect of the present invention, which is assembled, taken along an input shaft.

Referring to FIGS. 1 to 3, a motor-driven power steering system includes: a input shaft 1 that is connected to a steering handle; an output shaft 3 that is connected to a steering wheel; a motor that is disposed to provide an assistant steering force to the output shaft 3 in the rotation direction of the input shaft 1; a torsion bar 5 that connects input shaft 1 with output shaft 3 to make a torsional displacement in steering; a switch plate 7 and a resistant or resistor plate 9 that are independently disposed to input shaft 1 and output shaft 3, respectively, to selectively change resistance to and polarity of electricity that is conducted according the torsional displacement of torsion bar 5; an input member 30 that continuously supplies electricity to switch plate 7; and an output member 40 that continuously outputs the electricity that has passed through resistant plate 9, to the motor.

In the above configuration, the independent arrangement of switch plate 7 and resistant plate 9 to input shaft 1 and output shaft 3 signifies that switch plate 7 and resistant plate 9 may be disposed to input shaft 1 or output shaft 3, but are not disposed together and disposed at the opposite sides, corresponding to each other.

Switch plate 7 is formed in a circular plate shape with a hole at the center portion through which torsion bar 5 passes, and has two insulated switch electrodes 11 that are radially disposed in a portion of the circular plate, in which two switch electrodes are exposed to the outside at both upper and lower surfaces of the circular plate in an exemplary embodiment.

Resistant plate 9 is also formed in a circular plate shape with a hole at the center portion through which torsion bar 5 passes, and has a pair of left resistors 13 and a pair of right resistors 15, which are electrically insulated and correspond to paths that are constructed when two switch electrodes 11 of the switch plate 7 turns left or right from the neutral position, on the upper surface facing switch plate 7. Circular electrical plate patterns 17 that are electrically connected with the pairs of left resistors 13 and right resistors 15 and exposed to the outside are provided on the lower surface opposite to the pairs of left resistors 13 and right resistors 15, in which two electrical plate patterns 17 are coaxially disposed and electrically insulated.

In any one of the pairs of left resistors 13 and right resistors 15, the outer resistor on resistor plate 9 is connected with the outer one of electrical plate patterns 17 and the inner resistor on resistor plate 9 is connected with the inner one of electrical plate patterns 17. Further, in the other pair of resistors, the outer resistor of resistor plate 9 is connected with the inner one of electrical plate patterns 17 and the inner resistor of resistor plate 9 is connected with the outer one of electrical plate patterns 17.

Since any one of the pairs of left resistors 13 and right resistors 15 is connected with electrical plate patterns 17 in the opposite way to the other, the electrode of electricity that is supplied from the motor is switched according to the steering direction, such that the direction of the assistant steering force that is provided from the motor can be changed.

Though not shown in the drawings, a column shaft that covers the outer sides of input shaft 1, torsion bar 5, and output shaft 3, and in various embodiments, a case, having an upper case 19a and a lower case 19b, that is fixed to the column shaft and covers resistor plate 9 and switch plate 7 is further provided.

The output member 40 is fixed to lower case 19b and includes an output plate 23 with two output electrodes 21 that are electrically connected to the motor while each electrically contacting with the inner and outer ones of electrical plate patterns 17 of resistor plate 9.

Therefore, output electrodes 21 of output plate 23 are kept in electrical contact with electrical plate patterns 17 of resistor plate 9 even while resistor plate 9 is rotated by steering of the driver.

The input member 30 is formed in a circular plate shape that is fixed to upper case 19a and has a hole at the center portion through which torsion bar 5 passes, and includes an input plate 27 having electrical input plate patterns 25 that is coaxially aligned to the switch plate 7 and exposed to the outside to be in electrical contact with two switch electrodes 11 of switch plate 7.

Therefore, electrical input plate patterns 25 of input plate 27 can transmit electricity from a battery to two switch electrodes 11 of switch plate 7 even while switch plate 7 is rotated by steering of the driver.

The operation of various embodiments of the invention having the above configuration is described hereafter with reference to FIGS. 4 to 6.

FIG. 4 shows a position when the driver does not steers the vehicle, in which torsion is not exerted in torsion bar 5 between input shaft 1 and output shaft 3 while switch electrode 11 of switch plate 7 are positioned at a space between left pair of resistors 13 and right pair of resistors 15 of resistor plate 9 as shown in FIG. 4. Further, electricity that is supplied from input plate 27 to switch electrodes 11 of switch plate 7 is not conducted to any components, such that the electricity cannot conducted to the motor through output electrodes 21 of output plate 23.

As the driver steers the vehicle to the left under the above conditions, torsional deformation is made in torsion bar 5 between input shaft 1 and output shaft 3, such that relative rotation is made between switch plate 7 disposed to input shaft 1 and resistor plate 9 disposed to output shaft 3. Accordingly, switch electrodes 11 of switch plate 7 contact with left pair of resistors 13 as shown in FIG. 5, in which the contact points depends on the amount of torsion of torsion bar 5.

In the above operation, when the amount of torsion of torsion bar 5 is small, left pair of resistors 13 forms a variable resistor circuit having a large resistance value as shown at the upper side of FIG. 5, while, as the amount of torsion of torsion bar 5 increases, left pair of resistors 13 forms a variable resistor circuit of which the resistance value gradually decreases as shown at the lower side of FIG. 5.

Therefore, when the amount of torsion of torsion bar 5 is small, a small amount of electricity is supplied to the motor through resistor plate 9 and output electrodes 21 of output plate 23, whereas, when the amount of torsion is large, a relatively large amount of electricity is supplied to the motor, such that the strength of the assistant force that is provided from the motor can be automatically changed according to the amount of torsion of torsion bar 5.

FIG. 6 shows a position when the driver steers the vehicle to the right, in which switch electrodes 11 forms a variable resistor circuit by contacting with right pair of resistors 15 of resistor plate 9. In this case, the polarity of electricity is changed due to the configuration that the pairs of the right resistors 15 are cross-connected to the circular electrical plate pattern 17 as shown in FIG. 3. Further, the resistance value of the variable resistor circuit decreases as the amount of torsion of torsion bar 5 increases as in the above operation, such that more electricity can be supplied to the motor.

Therefore, the strength of the assistant steering force that is provided by the motor can be automatically increased/decreased according to the amount of torsion of torsion bar 5 and the polarity of electricity also is changed according to the direction of torsion deformation of torsion bar 5.

In detail, since right pair of resistors 15 are connected to electrical plate patterns 17 in the opposite way to left pair of resistors 13 as described above, such that when switch electrodes 11 is in contact with right pair of resistors 15, electricity having the opposite polarity to when contacting with left pair of resistors 13 can be supplied to the motor. Accordingly, it is possible to appropriately drive the motor in desired directions to appropriately assist the steering force according to the steering direction of the driver.

Further, as described above, as the torsional deformation of torsion bar 5 is removed by the assistant steering force provided by the motor, switch electrodes 11 returns to the position shown in FIG. 4, in which switch electrodes 11 are insulated from left pair of resistors 13 and right pair of resistors 15 and an assistant steering force is not generated any more by the motor.

As described above, unlike to motor-driven power steering systems in the related art, it is possible to generate an appropriate assistant steering force that is required to drive the motor according to steering of the driver, without expensive components, such as a torque sensor and an electronic controller, such that it is possible to achieve a motor-driven power steering system having a simple structure at a low cost.

For convenience in explanation and accurate definition in the appended claims, the terms "upper" or "lower", "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A motor-driven power steering system, comprising:
   an input shaft that is connected to a steering handle;
   an output shaft that is connected to a steering wheel;
   a torsion bar that couples the input shaft with the output shaft to make a torsional displacement in steering;
   a switch plate disposed to the input shaft and a resistor plate disposed to the output shaft respectively, to change selectively resistance to and polarity of electricity according the torsional displacement of the torsion bar;
   an input member that continuously supplies the electricity to the switch plate, the input member coupled to a first stationary member; and
   an output member that continuously outputs the electricity that has passed through the resistor plate, the output member coupled to a second stationary member;
   wherein the switch plate, comprises:
     a circular plate formed with a hole at the center portion thereof through which the torsion bar passes; and
     insulated switch electrodes radially disposed in the circular plate and exposed to the outside at both upper and lower surfaces of the circular plate;
   wherein the resistor plate comprises:
     a circular plate formed with a hole at the center portion thereof through which the torsion bar passes;
     a pair of first variable resistors and a pair of second variable resistors formed on the same side of the circular plate, which are electrically insulated respectively and have a shape corresponding to trajectories that are constructed when the insulated switch electrodes of the switch plate turn from a neutral position with respect to the torsion bar, the pair of the first variable resistors and the pair of the second variable resistors provided on the side facing the switch plate; and
     electrical plate patterns that are electrically connected with the pairs of the first variable resistors and the second variable resistors respectively and provided on the opposite side to the pairs of first resistors and second resistors, the electrical plate patterns coaxially disposed and electrically insulated;
   wherein the outer resistor of the first variable resistors is connected with outer one of the electrical plate patterns and inner resistor of the first variable resistors is connected with inner one of the electrical plate patterns, whereas, outer resistor of the second variable resistors is connected with inner one of the electrical plate patterns and inner resistor of the second variable resistors is connected with outer one of electrical plate patterns.

2. The motor-driven power steering system as defined in claim 1, wherein when torsion of torsion bar is increased, resistance of the pair of the first variable resistors circuit is configured to be increased and the second variable resistor is short and when rotation direction of torsion bar is opposite and the torsion of the torsion bar is increased, the pair of the first variable resistors is short and the resistance of the pair of the second variable resistors is configured to be increased.

3. The motor-driven power steering system as defined in claim 1, further comprising:
   a column shaft that covers outer sides of the input shaft, the torsion bar, and the output shaft; and the first stationary member and the second stationary member that are fixed to the column shaft and covers the resistor plate and the switch plate.

4. The motor-driven power steering system as defined in claim 3, the switch plate is fixed to the first stationary member.

5. The motor-driven power steering system as defined in claim 4, the first stationary member is an upper case.

6. The motor-driven power steering system as defined in claim 4, the resistor plate is fixed to the second stationary member.

7. The motor-driven power steering system as defined in claim 6, the second stationary member is a lower case.

8. The motor-driven power steering system as defined in claim 7, the upper case and lower case is made monolithically.

9. The motor-driven power steering system as defined in claim 1, wherein the input member comprises:

a circular plate formed with a hole at the center portion through which the torsion bar passes; and electrical input plate patterns that are coaxially formed on a surface facing the switch plate and in electrical contact with the insulated switch electrodes of the switch plate.

10. The motor-driven power steering system as defined in claim 1, wherein the output member comprises:

a circular plate, formed with a hole at the center portion through which the torsion bar passes; and output electrodes being in electrical contact with the circular electrical plate patterns of the switch plate.

11. A passenger vehicle comprising the motor-driven power steering system as defined in claim 7.

12. The motor-driven power steering system as defined in claim 7, wherein the assistant steering force is provided to the output shaft in a rotation direction of the input shaft.

* * * * *